United States Patent [19]

Knapp

[11] Patent Number: 5,895,619
[45] Date of Patent: Apr. 20, 1999

[54] METHOD FOR CASTING A BIDIRECTIONAL FOAM PIG

[76] Inventor: Kenneth M. Knapp, 1209 Hardy, Houston, Tex. 77020

[21] Appl. No.: 08/784,602

[22] Filed: Jan. 21, 1997

[51] Int. Cl.⁶ .................... B29C 39/10; B29C 39/12
[52] U.S. Cl. ............ 264/157; 264/261; 264/267; 264/279; 264/313; 249/83; 249/155; 425/127
[58] Field of Search ........................ 264/157, 159, 264/46.4, 46.5, 46.6, 46.247, 261, 263, 267, 279, 313; 249/83, 84, 90, 173, 155; 425/124, 127; 15/104.05, 104.061

[56] References Cited

U.S. PATENT DOCUMENTS

| | | | |
|---|---|---|---|
| 2,369,067 | 2/1945 | Mayer | 164/354 |
| 3,725,968 | 4/1973 | Knapp et al. | 15/104.061 |
| 3,875,606 | 4/1975 | Landers | 15/104.061 |
| 3,879,790 | 4/1975 | Girard | 15/104.061 |
| 4,083,076 | 4/1978 | Girard | 15/104.061 |
| 4,525,133 | 6/1985 | Bergmann | 425/120 |
| 4,714,576 | 12/1987 | Cotton et al. | 264/46.5 |
| 5,533,224 | 7/1996 | Knapp | 15/104.061 |
| 5,625,917 | 5/1997 | Hawkins | 15/104.061 |

*Primary Examiner*—Jill L. Heitbrink
*Attorney, Agent, or Firm*—Gunn & Associates, P.C.

[57] ABSTRACT

The present disclosure sets forth both a method and apparatus for molding a unitary pig formed of two types of material, one being a light weight foam, and the other being a harder polymeric material thereby yielding a unitary harder material in the cast pig. The finished product involves N discs having parallel end faces and a central drilled core; the unitary cast harder material defines end located discs located adjacent to said foam core and a central core therein so that the end located discs adjacent to the foam donut are unitary with the core and bonded thereto.

12 Claims, 1 Drawing Sheet

METHOD FOR CASTING A BIDIRECTIONAL FOAM PIG

BACKGROUND OF THE DISCLOSURE

In the casting of pigs, it is common to provide a pig sized for practically all sizes of pipes. The pipes are measured with their nominal diameter. It is common to pig fluid flow lines of sizes from about 4" and up so that the offering of a single pig design or shape requires a large number of molds in which to cast the pigs. In some instances, the pigs are made with a central body supporting mountable discs or cups. While this reduces the size of the mold, it still indicates that a specific mold size and shape is required to cast an individual cup or disc. Sometimes a large diameter mold can be made smaller by positioning a removable insert in it. In making a 16" disc, it is possible to reduce the diameter of the mod to 12", and perhaps even to 10" with an insert. However, this may require a more sophisticated insert in that reduction of the diameter changes the ratio of diameter to thickness. That ratio must be carefully observed to avoid departing from the design criteria which normally takes into account both diameter and thickness. As will be understood, the costs increase with an increase in diameter.

Common flow lines are found at 2" intervals. Therefore, beginning at 4", the nominal sizes of a set of pigs of a particular design should encompass the diameters of 4, 6, 8, 10, 12, etc. The measurements in inches again are the representative or nominal diameters. While the precise diameter or I.D. of the pipe may vary somewhat from the nominally stated dimension, the germane point of this discussion is that there is a required mold for each and every size. The molds become more expensive at greater sizes while the number of larger size pigs sold are reduced. Restated, there is simply a greater installed mileage base of pipelines measuring 12" and 16" compared to 32" or 36". To be sure, 36" pipelines exist but they require a mold which is much larger, they involve handling of much greater weights in molding and after molding and the unit sales do not correspond with the increased size of pipe diameter. Again, the most common pig sizes sold are typically 8, 12 and 16". The greater mileage of pipe of these dimensions requires a larger number of pigs of these sizes.

With the advent of a new type pig, capitalization cost must encompass the cost of making the molds. This can easily require a dozen molds to offer to the trade the different sizes of a newly devised pig. The present disclosure is directed to a method and apparatus for molding pigs which reduces the mold cost significantly. Indeed, through the present disclosure, pig cost can be significantly reduced and the capitalization cost can be reduced even more. This reduces storage space required for molds when not in use, and also reduces significantly the difficulties of handing such molds. As will be understood, a metal mold for making a 36" pig is quite heavy. In effect, it resembles a very large, heavy metal barrel and has to be handled with overhead hoists.

The present disclosure also sets forth an improved pig which is able to travel in both directions in a pipeline. For a pigging operation, removal and reversal of the pig can be done easily if there is a trap for the pig and if the pig is relatively small. When the pig is up to 12 or 16" in diameter, it can be handled easily. That is not so for a large pig. For instance, a pig measuring 24, 30 or 36" in diameter cannot be pulled easily from a pig trap reversed and reinserted for launching in a pipeline. It is necessary in many instances for a pig to travel in a bidirectional fashion. For instance, the pig may be launched from one location, sent to another location a few hundred feet or a few miles away, and then returned to the first location by reversing the flow. Pig travel in the pipe runs the risk of leakage around the pig. Leakage occurs as a result of flow by. There is another problem in handling the pig at the time of reversal. When the pig is exceedingly large and cannot be pulled from a pig trap and relaunched after reversal, it is important to have a pig that can run in both directions. Pigs made with cups simply cannot do this. Pigs made with discs can do this provided the cups do not deform. It is necessary to therefore flip the disc. By that, the bow in the disc must be reversed. So to speak, the frictional drag around the lip of the disc causes the surrounding edge to drag and fall behind the pig body. At the end of the line where a reversal in direction is required, the pig disc must snap, i.e., it must reverse or flip the peripheral edge to a trailing position. That is not easily accomplished in pigs. The present disclosure sets forth a pig which can accommodate these requirements. It is a pig which provides quality sealing in a pipeline. More than that, it is a bidirectional pig which is able to reverse movement without requiring intervention. The pig is simply reversed in its direction of movement and the discs in the pig are reversed. Such reversal is accomplished by the present pig taking into account the alternating hard and soft portions thereof. This pig construction enables reversal easily so that subsequent pig travel in the pipeline is readily done without difficulty.

In one aspect of the present invention, the pig is a two part polymeric foam system. The bulk or body of the pig is made of a soft foam. Several disks are integrally constructed along with a central core and they are made of a harder polymeric material. By forming the pig in alternate layers, improved sealing characteristics are obtained and the pig is able to flip, i.e., to move the peripheral edge to a trailing position with respect to the central core of the pig when reversed movement occurs.

In one aspect of the present disclosure, the pig is constructed so that there is better bonding of the components of the pig. One component is made of a light foam and is positioned adjacent to and serves as a mold piece for a heavier disc material. As the mold for the heavier material, better bonding is obtained between the two types of materials. This assures that the pig is able to hold together in a better fashion. This prevents breaking apart at the interface between different types of materials.

The present disclosure is therefore summarized as an improved method of manufacture of a molded pig formed of two parts or types of material. They are assembled by cutting donuts from a solid foam cylinder made of a very light weight foam. By use of surrounding straps, several donuts are joined in a single pour which defines the axial core and discs at spaced locations including the two ends of the pig. The several discs are defined at the same diameter to enable quality sealing in a pipe.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

DETAILED DESCRIPTION OF THE PREFERRED EMBODIMENT

Figure 1:
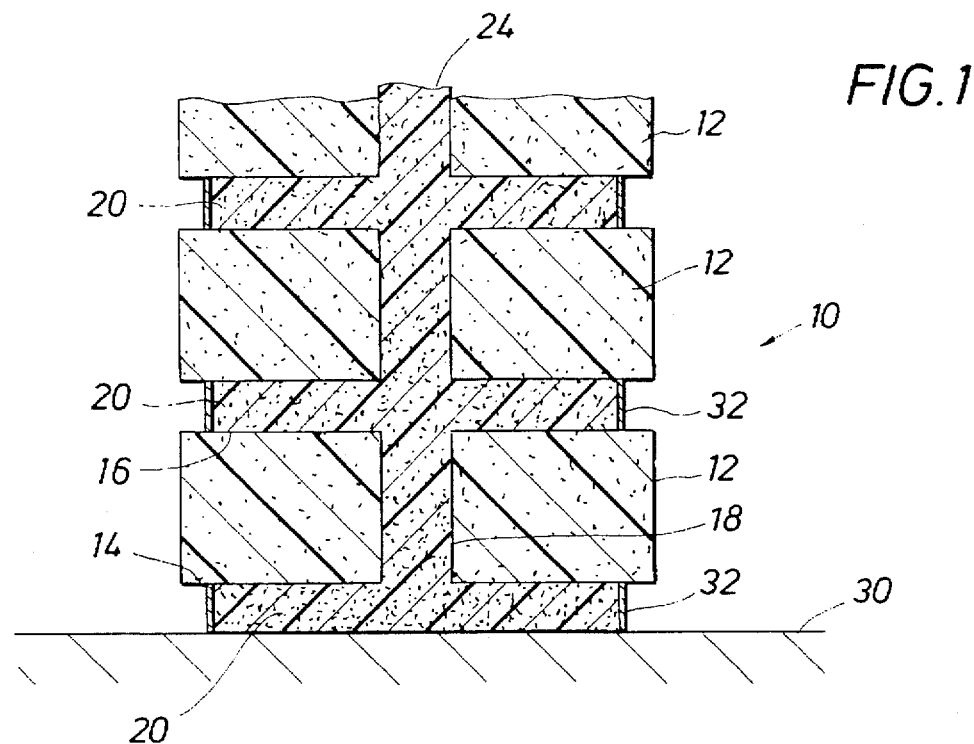
FIG. 1 is a sectional view of the two component polymeric pig of the present disclosure shown in sectional view wherein foam donuts are spaced apart to define discs therebetween made of a harder material so that the finished product is formed of two different types of polymeric materials.

Attention is first directed to FIG. 1 of the drawings where the finished pig is shown in sectional view. It is shown in the context of the molding equipment. The pig will be described with the manufacturing process. Several examples will be given.

The pig 10 shown in FIG. 1 is a fabricated device which is made from several foam donuts 12. The foam donuts 12 are cut from a cylinder and therefore have a common diameter. More will be noted regarding that diameter in regard to a particular pipe size. The donuts 12 are preferably provided with uniform diameter, are cut at right angles, and have equal thickness. The donuts 12 are formed from foamed open cell polyurethane which is made to a very light weight. The polyurethane foam is in the range of about 3 to about 12 pounds per cubic foot in weight. While it can be made heavier, that is more costly in that more ingredients are required and the increase in weight of the foam does not provide any particular benefit to the structure. As a cost reduction aspect, the weight of the foam is preferably lighter and is typically in the range of about 4 or 5 pounds per cubic foot. The acceptable range appears as stated but the preferred density is about 5 pounds per cubic foot.

The foam donut has a lower face 14 parallel to an upper face 16. The faces 14 and 16 are parallel and are defined by cutting. Cutting opens up the surfaces 14 and 16 so that the surfaces regions are porous. The significance of this will be enhanced later. The donut 12 is also drilled to form the central axial passage 18. The passage 18 is sized to a common size for all the donuts. Indeed, the pig is assembled with a number of donuts which are identical in material and external dimensions. The opening 18 defines the diameter of the core. It will be therefore described as the core diameter to distinguish from the foam outside diameter.

A single pig is made of N donuts. N is a whole number integer and is preferably in the range of 3 to 7. While it is possible to make a longer pig where N equals 8 or more, no particular gain or benefit is obtained. In like fashion, it is possible to make a pig with two such donuts but it is generally desirable for sealing purposes to utilize a longer pig, i.e., one wherein N is in the range of 3 to 7 and the preferred values of N are 4, 5 or 6. The finished pig 10 is constructed with a smaller disc 20. The disc 20 is shown at the faces of the donut 12. The faces 14 and 16 bear against the disc 20. Again, the several discs 20 are identical and differ only in location. Since the number of donuts is given by the symbol N, there are N plus 1 of the discs 20. This enables one to be located at the leading end and one at the trailing end of the completed pig 10. The several discs 20 are preferably made of the same material and are made in a common pour so that they have the same hardness and other material characteristics.

The numeral 24 identifies the core of the pig. It is formed integral with the disc 20 and is also made at the same time. It therefore has the same material strength. The core 24 is constructed on the interior of the several donuts 12 and is confined within them by virtue of the casting process. It bonds to the donuts 12 in a fashion to be described.

Figure 2:
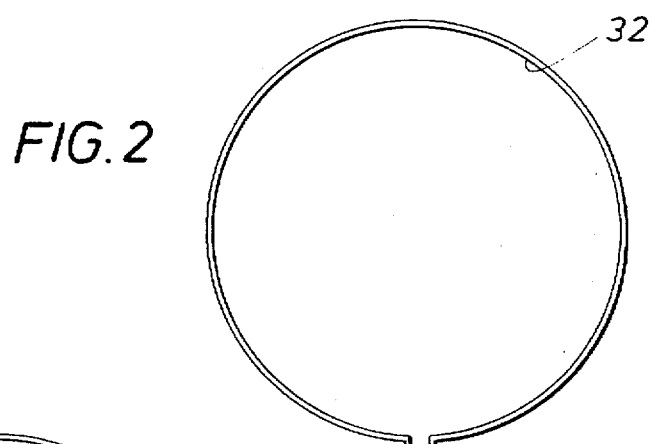
FIG. 2 is a view of a strap used in the molding process.

Manufacturing involves molding on a flat planar surface 30. That is used to define the end face of the lowermost disc 20. The disc 20 is additionally defined by an encircling strap 32. The strap 32 is shown also in FIG. 2 of the drawings. It has the form of a hoop which is circular. It is constructed of strap material which is typically a coated steel strap or belt. At the ends, it is provided with a pair of upstanding tabs 34 or belt pulled tight by connecting a nut and bolt to the tabs 34. This pulls the hoop to closure and defines a full circle. The inside face of the strap is coated with a mold release material prior to use. The strap 32 is assembled and laid on the surface 30. It is centered with respect to the donut 12 positioned thereabove. Conveniently, the donut can be simply rested on the strap. The strap has an edge which is not sharp but is relatively narrow so that it forms an encircling dimple in the foam donut 12. The dimple represents a region of slight donut deformation. The donut 12 is rested on the strap 32 and then another strap 32 is positioned on top of it. The second strap is aligned so that it is concentric with the bottommost strap 32 and has the same diameter. Preferably again, the two straps are made to the same diameter. Another donut is then stacked on top of that strap, and the process is continued until the number of donuts in the stack is the desired number represented by N and the preferred number is 4, 5 or 6 donuts. The last strap 32 is placed at the top side of the top donut to thereby define the topmost disc. At this point another place similar to the place 30 is placed over the top of the stack. This defines the exposed face of the most extreme disc. A liquid polyurethane is poured in the top and fills the assembled mold structure. The mold structure is made up primarily of the donuts 12. It includes also the N plus 1 straps 32. The urethane is poured in the core passage 18 and fills from the bottom up.

The straps 32 define the thickness of the several discs 20. The several discs 20 are poured integral with the core 24. A suitable curing interval is permitted at which time the mold can be disassembled. Again, the mold in this particular instance is defined by the several donuts 12 and the straps, and includes the base place 30 on which the pig is rested. Should surplus polyurethane material be poured in the mold and some leak out around any of the straps 20, it does not pose much of a problem. For instance, if the strap 32 leaks slightly above the support plate 30, a relatively small amount of leakage will typically occur because the tackiness of the polyurethane material causes it to gel and cure readily. Therefore, disassembly is easily accomplished simply by removing the parallel plates 30, and then disconnecting the straps 32. The straps 32 are opened at the tabs 34 and are then removed. This enables the straps to be saved and reused. Moreover, once all the straps are removed, the finished pig is then available. The finished pig may then be painted with appropriate colors or the like and can then be shipped.

Figure 3:
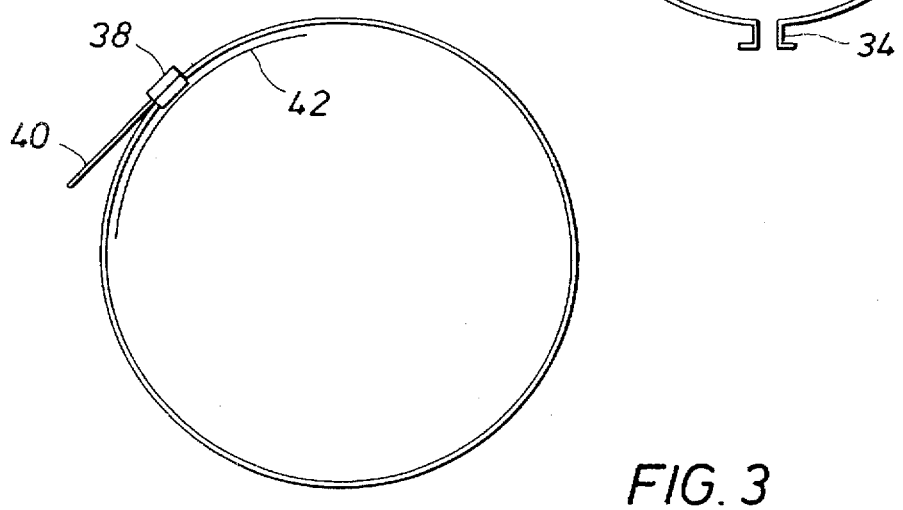
FIG. 3 is an adjustable strap used in molding.

FIG. 3 shows an alternate form of the strap 32. In this particular instance a single strap is used for several sizes. The strap is provided with a screwdriver operated latch which engages the strap and advances it with respect to the turnbuckle 38. The end of the strap 40 is surplus strap material. By adjusting the diameter, different sizes can be made. The strap material has openings in it along the length of the strap so that the turnbuckle can engage the openings and pull the strap tight or loose. This is necessary to change diameters. In the instance that perforations might otherwise leak, a thin sheet of paper or fiberboard is placed on the inside of the strap and can be thrown away or reused. Such a strip is shown at 42. In that sense, the paper strip 42 is a sacrificial component. It can be reused if permitted or can be discarded.

Going now to certain aspects of the present invention, it should be noted that the foam donuts 12 are cut from a larger foam cylinder. If it is desired to make a pig of 16" nominal rating, the donuts 12 are cut form an elongate cylinder of 16.2 to about 16.5" in diameter. The transverse cuts 14 and 16 cut into the open foam cell construction to define a relatively rough surface opening to the interior of the donut. The same is true of the core opening 18 which is drilled axially on the centerline. At both surfaces, the subsequently poured polyurethane material making up the end disc and core is harder and penetrates into the foam donuts to make a better bond. It is not uncommon in the casting of light polymeric materials that the mold surface causes a glossy and even slick product surface which is more or less devoid of bubbles. The slick surface has little adherence to the poured polyurethane material after setting. On cutting, the cut line intercepts a number of the interstitial openings of the foam structure. This permits some of the subsequently poured polyurethane material to penetrate into the donuts at the surface 14, 16 and 18 and thereby bond in a better fashion.

A heavier weight material is used for the disc 20 and the core 24. It preferably has a durometer of at least about 70 or 75 on the Shore A durometer scale. That can be as much as 90 depending on durability requirements.

The pig 10 of this disclosure is particularly able to traverse a number of pipe sizes. This will handle typical nipples and other reducers in a pipeline. Consider the following example. For a pig to be used in a nominal 12" pipe (recall that the pipe size is not precisely the I.D.), it is acceptable to make a disc 20 of the present disclosure with a diameter of 11.375". The foam donuts 12 are preferably ½" larger, i.e., they are 11.875". In the representative example given, the central core is about 1.5". The several discs 20 are approximately 0.375" thick. The donuts 12 are cut to a height of about 4 to about 4.5" thick. The elastomeric discs and the foam donuts flex together. They are in integral structure after the cure has been completed. They are integral in the sense that it is not possible to split them apart at the interfaces 14 and 16. Quality bonded connections are obtained. Moreover, this bonding provides an optimum pig construction for quality sealing. The several discs 20 are manufactured to approximately 1% greater than the nominal I.D. The foam donuts 12 are made about 5% larger than the pipe I.D. This speaks in particular of the nominal pipe I.D. as defined for the length of the pipeline. However, it is certainly possible that this pig will traverse a smaller opening such as a reducer or nipple which is as much as 10 or 12% smaller in diameter. Therefore, for a 12" nominal pipe, and making the pig in accordance with the dimensions specifically given above, the pig will traverse a reducer, nipple or pipe joint which is only 10" in diameter.

Bidirectional travel is permitted. The fluid drive behind the pig causes the central portions to bulge forward while the peripheral edges of the discs 20 drag behind. Bidirectional movement is permitted and is easily started simply by pushing at the opposite end of the pig with hydraulic pressure. The pressure that drives the pig forces the discs to flip, i.e., they snap so that they bow in the opposite direction. The bowing process is accomplished for all of the discs 20 because they are joined together and they reverse simultaneously.

While the foregoing is directed to the preferred embodiment, the scope thereof is determined by the claims which follow.

I claim:

1. A method of manufacturing a cast pipeline pig comprising the steps of:
   a) defining a disc diameter with at least two straps wherein said straps have the defined disc diameter and height for such discs;
   b) positioning said straps adjacent the upper and lower faces of a right cylinder donut of light foam polymeric material having a central passage therethrough;
   c) pouring in one pour to fill said lower and said upper strap adjacent to said foam donut and integrally casting a central core therein to define a unitary cast body of harder polymeric material; and
   d) removing the straps to thereby define spaced discs of harder polymeric material with respect to said foam donut.

2. The method of claim 1 including the step of positioning two foam donuts adjacent to a strap so that a disc is formed by said strap and said disc is bonded at upper and lower faces thereof to said two foam donuts.

3. The method of claim 2 including the step of pouring into a strap from the top to integrally form the unitary cast body.

4. The method of claim 1 including the step of positioning N foam donuts adjacent to N-1 straps and positioning two end located straps to form N plus 1 discs, wherein N is a whole number integer.

5. The method of claim 1 including the step of initially cutting upper and lower faces on said donut so that said faces intersect said foam donut to define interstitial opening therein.

6. The method of claim 1 including the step of cutting a central passage in said foam donut so that said donut passage is exposed to said poured harder polymeric material for bonding.

7. The method of claim 1 including the step of initially shaping said straps to said disc diameter, and releasing said straps by opening to a diameter greater than said disc diameter.

8. The method of claim 1 including the step of casting said unitary cast body to at least about 70 durometer on the Shore A durometer scale.

9. The method of claim 1 including the initial step of positioning at least two foam donuts on a common axis and aligning said donuts.

10. The method of claim 1 including the step of cutting N donuts from a common cylinder of specified diameter, and positioning said N donuts in axial alignment with spaced cut faces, wherein N is a whole number integer.

11. The method of claim 10 including the step of positioning N-1 discs between said N donuts and each of said discs is defined by a strap between adjacent donuts.

12. The method of claim 11 including the step of positioning a bottommost strap on a flat surface below the bottommost donut.

* * * * *